Patented June 18, 1940

2,204,582

UNITED STATES PATENT OFFICE 2,204,582

WEAR-RESISTING CERAMIC COMPOSITION

William B. Donahue, Ossining, N. Y., assignor to Feldspathic Research Corporation, New York, N. Y., a corporation of Delaware No Drawing. Application September 1, 1937, Serial No. 161,968

10 Claims. (Cl. 106—11)

This invention relates to ceramic compositions, and has for its object to provide an improved composition of this type having extreme toughness and long-wearing qualities which render it particularly suitable for use in the manufacture of grinding balls as well as for the linings of ball mills and other purposes where wear-resisting properties are of paramount importance.

There has long been a demand in the ceramic arts for an economical composition having sufficient toughness and wear-resisting properties for use in grinding balls such as are used in ball mills for grinding or pulverizing feldspar and other minerals, as well as for linings of such mills which, like the grinding balls themselves, must be capable of withstanding rough usage over long periods of time.

Aside from the matter of cost, which is an important consideration in products of the type referred to, there are two primary requisites that a grinding ball or ball mill lining must have. These are (1) absolutely non-porous body to prevent absorption of coloring oxides; (2) must be chip and wear resistant. Ordinary types of natural and artificial materials, particularly the porcelain grinding balls and linings of ball mills in common use today, do not fulfill these requirements to the degree expected and desired by ceramic manufacturers.

I have discovered that zircon, when bonded by a fired or glass bond, possesses to a remarkable degree the foregoing characteristics as well as many other advantages which render it peculiarly suitable for the manufacture of grinding balls, the linings of ball mills, and other purposes where similar characteristics of toughness, imperviousness and long wear are essential. A particular advantage of my zircon bodies bonded with a fired or glass bond is the low firing temperature which averages about cone 1, whereas the porcelain bodies heretofore used for similar purposes must be fired to cone 10 to 12. The easiest and least expensive stage of firing is up to cone 1, above which the firing involves a considerable expenditure of time and money, especially around cone 10.

Prior to my discovery, I investigated cold setting unfired bonds for zircon, including litharge and glycerol, chromic oxide, and phosphoric acid, but the results showed that none of these produced a sufficiently strong bond, nor did they produce a zircon body of the desired low porosity.

In describing my invention of a zircon body bonded by a fired or glass bond, I will dwell particularly on the use of my new composition in the manufacture of grinding balls, which is one of its principal uses, although it will be understood that the invention is capable of various other uses as referred to above.

In constructing my zircon body I have used a large number of glass or fired bonding agents covering the entire field of glass bonds. In this manner I have determined that any suitable type of glass forming bonding agent may be satisfactorily employed, provided the firing temperature is so regulated as to produce zero absorption. For example, the following types of glasses were investigated and proved entirely satisfactory for my purpose:

TABLE I

A. A commercial frit, known as "Ferro No. 3187," composed of flint, borax and boric acid. This represents the high $B_2O_3$ type of glass.

B. A commercial frit, known as "Ferro No. 3134," composed of flint, borax and whiting. This represents the high CaO (lime) type of glass.

C. A frit having the empirical formula:

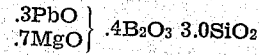

This represents the high magnesia (MgO) and medium lead (PbO) type of glass.

D. A frit having the empirical formula:

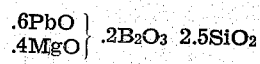

This represents the high lead type of glass.

The above represents all types of glasses and glass frits, the compositions of which can be changed as follows: The CaO, MgO and PbO can partially be replaced by ZnO, BaO; or the PbO can be replaced by the BaO, $Na_2O$ and $K_2O$ in various combinations. The $B_2O_3$ content in all of these glasses is required to make a tough, insoluble glass, resistant to shock, but may be replaced by $Al_2O_3$ or other of the amphoteric oxides. The amount of silica employed is the amount used in glasses fired to pyrometric cone 5–6. Glasses or frits of the type employed in pyrometric cone 14–15 porcelain glazes are also covered by the above compositions.

Investigation has shown that the degree of solubility of the zircon (during firing) in the glass employed, is not important so long as the firing temperature of the material is such that an absolutely non-porous product is produced. It was also determined that sodium silicate is not satisfactory, either alone or in conjunction with the above frits, as a medium to given strength in the dry state prior to firing. Sodium silicate causes the structure of the fired body to be vesicular, which is extremely detrimental. It was found that a high grade clay, preferably a plastic kaolin of the Florida type, or a ball clay low in iron, is best employed to produce workability and strength in the unfired state.

A wide range of the amount of frit necessary to produce zero absorption was investigated. It was found that 15 to 20 parts of frit per 100 parts of zircon was most satisfactory, and that 4 to 7 parts of the plastic clay was desirable to give good workability.

Examples of the most desirable mixes for the manufacture of grinding balls according to my invention are as follows:

100 parts zircon
15-20 parts of any one, or combination of, the glasses such as given in Table I
4-7 parts of high grade plastic clay.

The product is fired to the correct firing temperature which varies with each frit or combination thereof. For instance, the frits in Table I are best fired to 1850°-1950° F. for frit A and frit B; 2100°-2150° F. for frit C; 2050°-2100° F. for frit D. Smaller amounts of frit can be used with higher firing temperatures; however, in such case balls of inferior qualities are produced.

Methods of forming

There are three possible methods of forming zircon grinding balls. These methods are: (1) dry pressing; (2) casting; (3) stiff mud extrusion and rolling. The last method is that employed in the manufacture of porcelain balls.

From investigation, it was found that dry pressing produced an inferior ball which did not reach zero absorption before bloating and had no advantage in weight. The casting and stiff mud processes produce balls of excellent texture and of equal quality. The stiff mud process, as developed and employed by present-day manufacturers, appears to be the more economical method and is, therefore, recommended.

Properties of the zircon grinding ball

Zircon grinding balls constructed according to my invention have exceptionally good properties when compared to porcelain balls of the type in common use today. These properties are given in Table II.

TABLE II

| Property | Porcelain ball | Zircon ball |
| --- | --- | --- |
| Color | White | Grayish white. |
| Absorption | Zero | Zero. |
| Specific gravity | 2.3-2.4 | 3.8-3.9 (64% heavier). |
| Hardness | Zircon slightly harder than porcelain. | |
| Toughness | Porcelain balls more easily chipped than zircon. | |
| Rattler loss | Porcelain balls lost 40-45% more than the zircon balls. | |
| Rate of milling | Zircon balls will grind 1500-1700 pounds of material in the same time that porcelain balls will grind 1000 pounds; i. e., 50-60% faster. The zircon balls will lose only 50% as much weight per 1000 pounds of milled material as the porcelain balls. | |

Two of the above properties are worthy of special note. These are: (1) toughness; (2) rate of milling. One of the strongest claims for porcelain balls is their freedom from chipping. The zircon balls are considerably tougher than porcelain as tested by a sharp blow with a hammer. This property will insure the user against breakage of balls in the mill and also against the replacement of broken balls after each mill run. As a result the cost of ball inspection will be reduced, and the efficiency of milling will be increased.

As stated in Table II, tests indicate that zircon balls will mill 1500-1700 pounds of material in the same time required to mill 1000 pounds with porcelain balls. It was also stated that, per 1000 pounds of material milled, the porcelain will lose three to four times as much volume as the zircon. These properties are derived from the wearing quality of the zircon and the bulk specific gravity. This information is further elaborated in Table III.

TABLE III

|  | Porcelain ball | Zircon ball |
| --- | --- | --- |
| Pounds of balls to charge mill (equal number of balls) | 2000 | 3200 |
| Cost if both sell at $200 per ton | $200.00 | $320.00 |
| Relative weight of material milled per mill charge of balls | 1000.0 | 2200.0 |
| Relative cost per pound of milling based on mill charge and cost of balls | 100 | 73 |
| Relative efficiency based on above item. | Porcelain balls cost 1⅓ times as much per 1000 pounds of material milled as the zircon balls. | |

According to this table, it will cost the user ⅓ more for the balls per pound of material milled if porcelain is used instead of zircon. This is a substantial saving in the total cost of milling. There will also be substantially less contamination of the material being milled when zircon balls are employed.

From an economic standpoint my invention also has other special advantages as evidenced by the following data which has been computed, covering the cost of producing zircon balls according to my invention:

Zircon through 100 on 200 mesh, per ton__ $60.00
Zircon through 325 mesh_____per ton__ 100.00
Frit through 100 mesh_____per ton__ 120.00
Clay_____per ton__ 8.00
Manufacture, selling, etc., per ton of balls_____ 20.00

The cost of manufacturing one ton of balls will be:

Zircon through 100 on 200 mesh (1200 lbs.) _____ $36.00
Zircon through 325 mesh (400 lbs.) _____ 20.00
Frit (320 lbs.) _____ 19.20
Clay (80 lbs.) _____ .32
Manufacture _____ 20.00

Total cost_____ 95.52

These figures are based on a mix of the composition:

| | Per cent |
| --- | --- |
| Zircon through 100 on 200 mesh | 60.0 |
| Zircon through 325 mesh | 20.0 |
| Frit | 16.0 |
| Clay | 4.0 |

The grain size of zircon available at the lowest cost is approximately through 100 on 200 mesh. A mix containing only this one size of grain would be rather porous; hence, tests were made to determine the amount of fines necessary to produce greatest density. This was found to be 25% of zircon passing 325 mesh. The size of grains determines somewhat the amount of frit necessary to produce zero absorption. However, no limits or restrictions are necessary on the size of grains employed.

Method of mixing

In constructing grinding balls and other materials according to my invention, all the pulverized materials, zircon and frit, are mixed thoroughly in the dry state. The clay (through 20 mesh), and the plasticizer when used, are made into a thin slip. This slip is then added to the zircon and glass and thoroughly mixed. In the dry press mixes, no water other than that in the slip is added. In the stiff mud mixes, water is added to produce the desired consistency.

Method of forming

The dry pressed balls are formed in a special die under pressures varying from 2000 to 10,000 pounds per square inch.

The stiff mud mixes are first made into balls, approximately round, by hand and then pressed into a spherical plaster mold. These balls exhibited a poor structure because of nodules formed in the hand mixing. Because of this defective structure the plastic mix was run through a small pressure pug mill and the balls formed from the pugged mass. The structure of these balls was very uniform. In a commercial operation, the mix should be run through a de-airing pug mill and extruded as a cylindrical bar. The desired weight for each ball would be cut from this bar and formed into the ball by rolling or pressing.

Method of drying and firing

The formed balls are taken from the plaster mold and placed in a dryer operated at 150° F. No drying troubles are encountered.

The thoroughly dried balls are placed in a gas fired muffle kiln and fired according to a predetermined schedule (200° F. per hour) through the temperature range from 1850° to 2250° F. Draw trials are taken at 50° intervals. The correct firing temperature for each mix is determined from data obtained on the balls drawn at each temperature.

It was found from the first series of the foregoing test trials that 15 to 20 parts of fruit were necessary. A second series of balls were prepared, containing 16 per cent frit, and fired in the down draft kiln to a predetermined, correct temperature. The heat was held for one hour at the maximum temperature and then cooled rapidly to 1300° F. Five hours were required to cool from 1300° F. to 1000° F. This method of cooling served as an annealing period.

In testing zircon grinding balls prepared according to my invention, a rattler of the type employed in testing the resistance to abrasion of crushed stone and gravel was used. Five zircon, and then five porcelain balls, were placed in the chamber with ten 1¼ inch steel balls. The rattler was then given 8000 revolutions and the loss in weight of the balls determined. As another simple test, a fired ball of each mix was struck five sharp blows with a one pound hammer, and the ease and degree of chipping was compared to that of a porcelain ball with the results referred to above.

It will be evident that various changes may be made in the compositions and methods of manufacture herein described without departing from the scope and spirit of my invention which is to be limited only by the appended claims when interpreted in view of the prior art.

The invention claimed is:

1. A non-porous wear resisting ceramic composition consisting of unfused zircon bonded by a glass bond.

2. A raw batch for making a non-porous wear resisting ceramic composition consisting of zircon, clay and a glass frit.

3. A raw batch for making a non-porous wear resisting ceramic composition consisting of zircon, kaolin and a glass frit.

4. A raw batch for making a non-porous wear resisting ceramic composition consisting of zircon, a ball clay low in iron, and a glass frit.

5. A non-porous wear resisting ceramic composition consisting of substantially 100 parts of unfused zircon and 15-20 parts of a glass bond.

6. A grinding ball consisting of unfused zircon bonded by a glass bond.

7. A raw batch for making grinding balls consisting of zircon, clay and a glass frit.

8. A raw batch for making grinding balls consisting of zircon, kaolin and a glass frit.

9. A raw batch for making grinding balls consisting of zircon, a ball clay low in iron, and a glass frit.

10. A raw batch for making grinding balls consisting of the following ingredients in substantially the following proportions: 100 parts zircon, 4-7 parts clay, and 15-20 parts of a glass frit.

WILLIAM B. DONAHUE.